United States Patent [19]
Marrel

[11] Patent Number: 5,839,716
[45] Date of Patent: Nov. 24, 1998

[54] DEVICE FOR TRANSFERRING LIQUID UNDER SIMPLE OR ACCELERATED GRAVITY BY MEANS OF A VALVE

[75] Inventor: Didier Marrel, Vaugneray, France

[73] Assignee: VRM France, France

[21] Appl. No.: 857,336

[22] Filed: May 16, 1997

[51] Int. Cl.⁶ ................................................. F16L 37/28
[52] U.S. Cl. ........................................ 251/149.6; 251/357
[58] Field of Search ............................. 251/149.6, 149.1, 251/357, 332

[56] References Cited

U.S. PATENT DOCUMENTS

| | | | |
|---|---|---|---|
| 2,173,295 | 9/1939 | Coles et al. | 251/357 X |
| 2,411,057 | 11/1946 | Robbins | 251/149.6 |
| 2,584,188 | 2/1952 | Curtis . | |
| 3,187,770 | 6/1965 | Plamann . | |
| 3,825,222 | 7/1974 | Petrova | 251/149.6 |

FOREIGN PATENT DOCUMENTS 1301352  7/1962  France .
WO 93/08118  4/1993  WIPO .
WO 93/00445  8/1993  WIPO .
WO 93/23328  11/1993  WIPO .

*Primary Examiner*—Kevin Lee
*Attorney, Agent, or Firm*—Parkhurst & Wendel, L.L.P

[57] ABSTRACT

Device for transferring liquid under simple or accelerated gravity of a tubular-type stopper device equipped with an external thread having the same diameter and pitch as the internal screw thread of a tapped drain hole of a container. The tubular-type stopper device is screwed into the container so the tapped drain hole is a leaktight bore. A bore is normally closed by a check valve equipped with an annular gasket and a return spring. The check valve is actuated in the open position by an adapter, and a removable linkage between the stopper and the adapter are provided in order to enable the adapter to be fastened to the stopper when the container is drained. Axial linkages between the check valve and its annular gasket are formed by an annular groove in the check valve and a semi-rigid tubular member snapped over a portion of the head of the check valve to retain the gasket in position.

1 Claim, 7 Drawing Sheets

FIG. 5
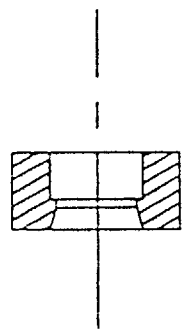
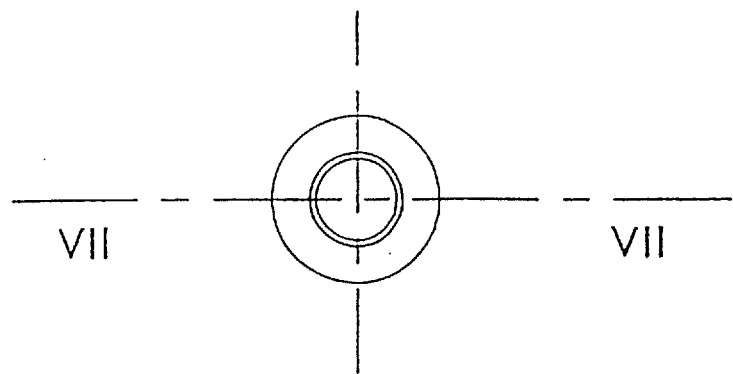
FIG. 6

4,839,716

DEVICE FOR TRANSFERRING LIQUID UNDER SIMPLE OR ACCELERATED GRAVITY BY MEANS OF A VALVE

TECHNICAL FIELD

The present invention relates to a device for transferring liquid under simple or accelerated gravity by means of a standard suction pump.

PRIOR ART

Existing devices, such as traditional stoppers, rapid connectors or valves have a number of drawbacks such as, in the case of traditional stoppers, for example, splashing, leakage, the need to have a tool to unscrew the stopper, the need to change the seal and the fact that it is impossible to connect it to a pump. In the case of valves or of rapid connectors, such equipment costs a considerable amount, requires several joining pieces of different sizes and, above all, takes up a considerable amount of space which may involve risks of damage owing to catching when the containers are movable such as movable containers, engine casings and other similar articles.

Document PCT/FR93/00445 discloses a device comprising, in combination, on the one hand a tubular stopper equipped with an external thread, with the same diameter and pitch as the internal screw thread of the tapped drain hole of the container into which it is intended to be screwed in a leaktight manner and whose bore is normally closed by a check valve, the head of which is located on that side of the end of the stopper which is located inside the container and is equipped with a flat-type gasket connected axially to the check valve, its seat consisting of the crown-shaped end of the stopper and of a return spring in the closed position, and, on the other hand, a tubular adapter which has a central member for actuating, in the open position, the check valve of the tubular stopper and an annular seal associated with a spring which tends to push it back in the direction of the assembly end of this adapter, this end being equipped with an axial stop for the seal and ensuring leaktightness between the tubular stopper and the adapter, movable linking means between the stopper and the adapter comprising, on one of these elements, a discontinuous flange extending over two angular sectors of less than 180° which are diametrically opposed and, on the other, two diametrically opposed studs, each of which is capable of being engaged behind one of the aforesaid flange sectors.

In this device, the seal is held in position on the check valve by crimping of the free end of the check valve over the seal, with a bearing washer being placed in between. Unfortunately, this crimping does not make it possible to guarantee precision in respect of dimension, which would ensure that the seal was perfectly perpendicular with regard to the axis of the check valve, and may lead to a defect in the link between the seal and its bearing surface, and hence the possibility of a leak.

In the event of poor crimping, the check valve is no longer held in position and is expelled from the body of the stopper through the action of the pressure of its return spring. Moreover, crimping requires the use of a metal check valve which involves machining costs which are high when compared to the cost of manufacture with materials which are capable of being injected.

SUMMARY OF THE INVENTION

The present invention aims to remedy these drawbacks. To this end, in the check valve of the tubular stopper forming the device of the aforesaid type:

the axial linking means between the check valve of the stopper and its annular gasket comprise, on the one hand, on the check valve (2), an annular groove (10) in which the seal, whose thickness is equal to the width of the groove, is capable of being engaged by virtue of the elastic deformation of its bore and, on the other hand, a semi-rigid tubular member (5) capable of being engaged in and snapped over a complementary extension of the end of the head of the check valve (12) located inside the container to ensure satisfactory holding of the seal (3) in the closed position.

This new snap-over system allows:

the check valve to be more leaktight on account of the greater control of the dimensional tolerances, which ensures that the seal is satisfactorily perpendicular with regard to the body of the stopper. Leaktightness is therefore completely guaranteed over the entire bearing surface of the seal. This process eliminates random deformational phenomena when the metal is being crimped.

greater security by virtue of the annular groove which holds the gasket in place if the snap-over system fails.

a lower cost of manufacture through simplification of the assembly means and the possibility of manufacturing processes which are better adapted to mass production, particularly by means of the injection of plastics.

BRIEF DESCRIPTIONS OF THE FIGURES

FIG. 5 shows the snap-over washer according to section VII—VII in FIG. 6.

FIG. 6 shows the snap-over washer from the bottom.

ILLUSTRATIVE EMBODIMENT

Figure 1:
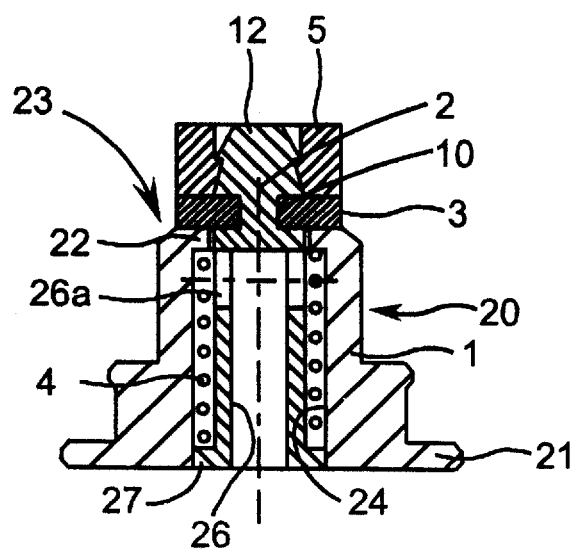
FIG. 1 shows a view of the tubular stopper in axial section.
Figure 2:
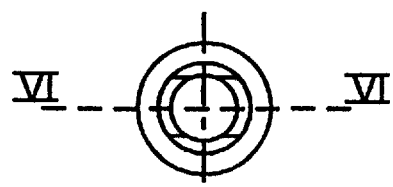
FIG. 2 shows a bottom view of the check valve of the tubular stopper.
Figure 4:
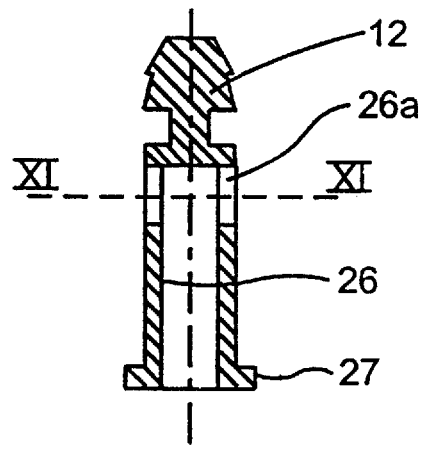
FIG. 4 shows a view in transverse section along VI—VI in FIG. 3.
Figure 3:
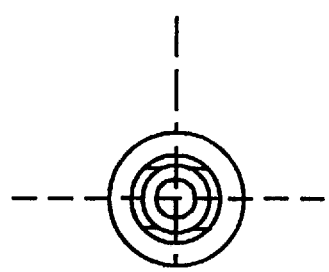
FIG. 3 shows a top view of the valve of the tubular stopper.
Figure 8:
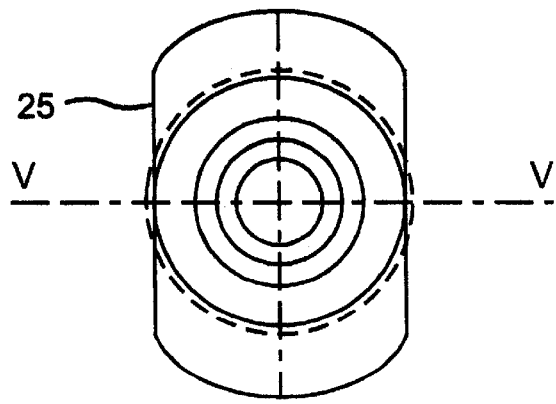
FIG. 8 is a plan, bottom view of the article in FIG. 9.
Figure 7:
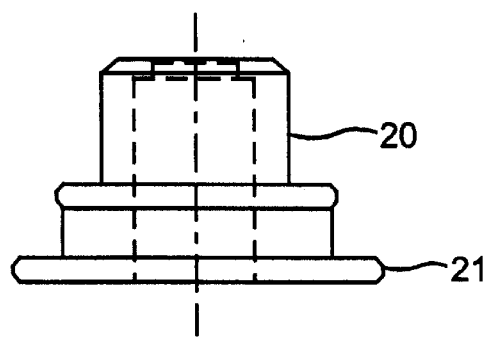
FIG. 7 is a side elevational view of the body of the tubular stopper.
Figure 9:
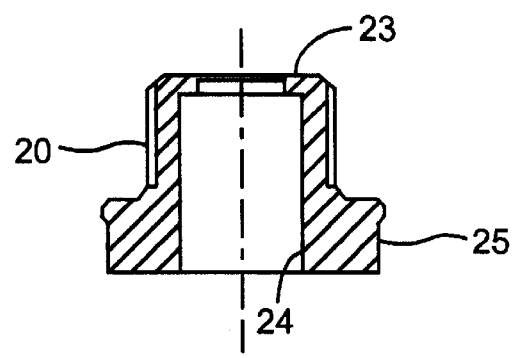
FIG. 9 is a sectional view along V—V in FIG. 8.

The tubular stopper (FIG. 1) is composed of five pieces, i.e. a body (1), a check valve (2), a check-valve seal (3), a return spring (4) and a snap-over system (5).

The body (1) has a threaded end (20) with a diameter and pitch which are determined by those of the tapped hole of the container 29 to which it has to be fastened, by screwing, and a flange (21), of identical size on all stoppers, which is interrupted by two diametrically opposed flats (25) dividing the flange (21) into two diametrically opposed sectors.

The front end (23) of the body (1) of the tubular stopper acts as a seat for the seal (3) of the check valve (2).

The body (1) of the tubular stopper has an axial bore (24) which is intended to receive the check valve (2) and its return spring (4) in the closed position.

Figure 10:
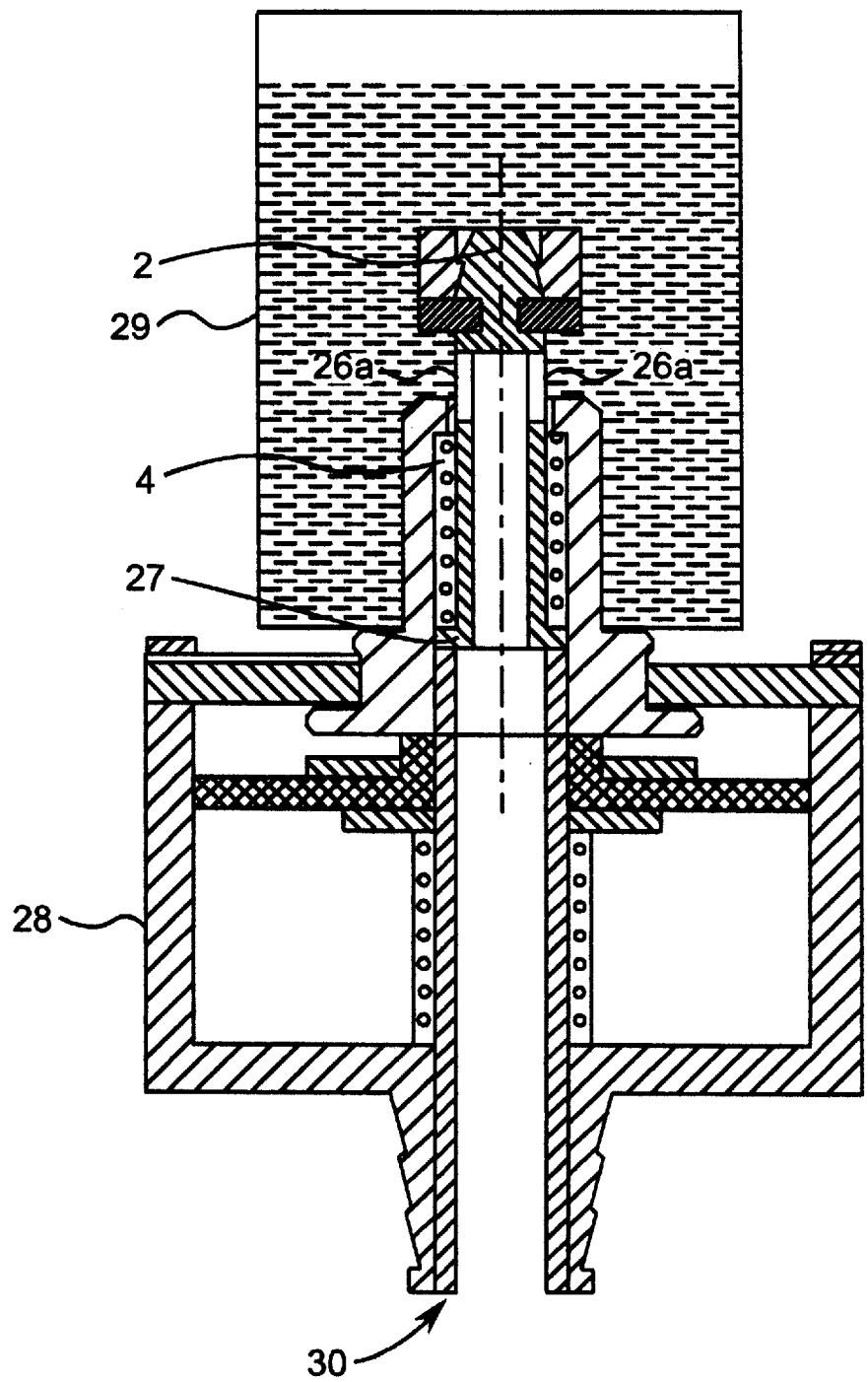
FIG. 10 is the stopper shown in an open position connected to an adapter and screwed into a container.
Figure 11:
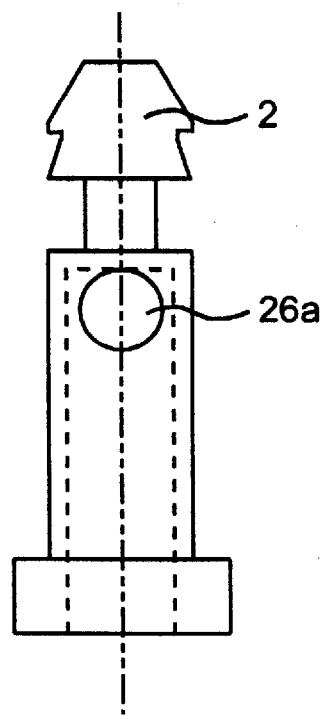
FIG. 11 is a side view of the check valve showing the lateral orifice.
Figure 12:
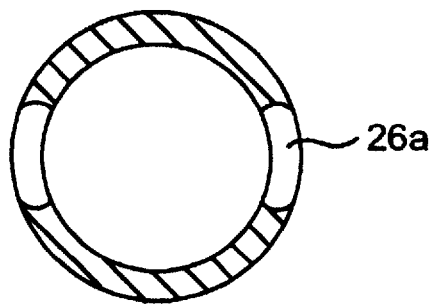
FIG. 12 is a sectional view of the orifice 26a shown in FIG. 11.

As shown in FIGS. 10–12, the check valve (2) has an axial bore (26) in which at least one lateral orifice (26a) is made to allow the passage of the liquid to be removed from the container. At its free end, the check valve (2) has an external flange (27) which serves as a bearing surface, via its inner face, for its return spring (4) which, via its other end, bears against an inner flange (22) of the end of the body (1) of the stopper forming the check valve (2).

FIG. 10 depicts the outer face of the flange (27) of the check valve (2) is intended to receive the axial thrust of the thrust tube 30 of the adapter 28 when the latter is fastened to the tubular stopper as shown.

The annular groove (10) of the end of the check valve (2) located inside the container is intended to receive the gasket (3) of the check valve (2). This seal is flat, which dispenses with the need to machine its seat at the inner end of the body (1) of the stopper.

The gasket (3) is held by the groove (10) and by a semi-rigid tubular member (5) snapped over the end of a complementary extension (12) of the corresponding end of the head of the check valve (2). The spring (4) normally holds the check valve (2) in the closed position. Provision could also be made for a greater number of flats (25) on the flange (21) instead of the two which are provided.

What is claimed is:

1. A device for transferring liquid under simple or accelerated gravity from a container comprising a tubular stopper having an axial bore, said tubular stopper having at a front end an external thread matching a size of a tapped drain hole of said container;

a normally closed check valve having at least one lateral orifice and a return spring, said check valve being received in the axial bore of said tubular stopper so that the lateral orifice of said check valve is within said axial bore during a closed position;

said check valve having a head with a complementary extension at one end and an external flange at an opposite end, an inner face of the external flange of said check valve retaining said return spring against an inner flange of the tubular stopper and an outer face of said external flange capable of receiving a tube thrust into the bottom end of said tubular stopper to open said check valve; and axial linking means comprising an annular groove on a neck of said check valve to receive a matching-sized annular gasket; and a semi-rigid tubular member, complementary in shape to the head of said check valve, wherein said semi-rigid tubular member is engaged in and snapped over the complementary extension of the head of said check valve so that said annular gasket is firmly retained against a seat of the front end of said tubular stopper.

* * * * *